United States Patent
Hodgson

(10) Patent No.: US 10,109,089 B2
(45) Date of Patent: Oct. 23, 2018

(54) SYSTEMS AND METHODS FOR PROVIDING TEXTUAL SOCIAL REMARKS OVERLAID ON MEDIA CONTENT

(71) Applicant: Facebook, Inc., Menlo Park, CA (US)

(72) Inventor: Phillip Hodgson, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 780 days.

(21) Appl. No.: 14/586,437

(22) Filed: Dec. 30, 2014

(65) Prior Publication Data

US 2016/0189407 A1 Jun. 30, 2016

(51) Int. Cl.
| | |
|---|---|
| G06T 11/60 | (2006.01) |
| G06F 3/0484 | (2013.01) |
| G06F 3/0488 | (2013.01) |
| G06F 3/0481 | (2013.01) |
| H04L 12/58 | (2006.01) |

(52) U.S. Cl.
CPC ............ *G06T 11/60* (2013.01); *G06F 3/0484* (2013.01); *G06F 3/04812* (2013.01); *G06F 3/04883* (2013.01); *H04L 51/10* (2013.01); *H04L 51/32* (2013.01)

(58) Field of Classification Search
CPC ..... G06T 11/60; G06F 3/04812; H05L 51/10; H05L 51/32
See application file for complete search history.

(56) References Cited

U.S. PATENT DOCUMENTS

| | | | |
|---|---|---|---|
| 6,108,437 A | 8/2000 | Lin | |
| 7,636,450 B1 * | 12/2009 | Bourdev | G06F 17/30256 382/100 |
| 8,495,489 B1 | 7/2013 | Everingham | |
| 2013/0117692 A1 * | 5/2013 | Padmanabhan | H04N 21/4126 715/753 |
| 2013/0145248 A1 | 6/2013 | Friedlander et al. | |
| 2014/0052785 A1 * | 2/2014 | Sirpal | G06F 3/017 709/204 |
| 2014/0188997 A1 * | 7/2014 | Schneiderman | H04L 51/32 709/204 |
| 2014/0215512 A1 | 7/2014 | Maruyama et al. | |
| 2014/0254892 A1 | 9/2014 | Park et al. | |
| 2015/0052439 A1 * | 2/2015 | Pasquarette | G06F 3/04845 715/731 |
| 2015/0067482 A1 * | 3/2015 | Georgiev | G06F 17/211 715/244 |

OTHER PUBLICATIONS

International Application No. PCT/US2014/073023, International Search Report and Written Opinion dated Aug. 11, 2015.

* cited by examiner

*Primary Examiner* — Omar R Abdul-Ali
(74) *Attorney, Agent, or Firm* — Sheppard Mullin Richter & Hampton LLP

(57) ABSTRACT

Systems, methods, and non-transitory computer-readable media can identify, in an image, a face associated with a user. It can be determined that the user has posted a comment in association with the image. A position in the image at which the face is located can be determined. The comment can be presented to appear to overlay the image and to appear within an allowable proximity from the position at which the face is located.

17 Claims, 9 Drawing Sheets

SYSTEMS AND METHODS FOR PROVIDING TEXTUAL SOCIAL REMARKS OVERLAID ON MEDIA CONTENT

FIELD OF THE INVENTION

The present technology relates to the field of providing content. More particularly, the present technology relates to techniques for providing textual social remarks overlaid on media content.

BACKGROUND

Today, people often utilize computing devices (or systems) for a wide variety of purposes. Users can use their computing devices to, for example, interact with one another, create content, share information, and access information. In some cases, a user of a social networking system (or service) can utilize his or her computing device to create and post media content, such as an image, at the social networking system. In some instances, the user as well as others can post comments about the image.

Under conventional approaches, images are typically displayed in a particular section of an interface and comments about the image are typically displayed in a separate section. Also, conventional approaches generally display images and comment sections in a static and unchanging manner. Moreover, in accordance with conventional approaches, users who post images of themselves are sometimes hesitant to provide comments about such images. As such, conventional approaches can be uninteresting, insufficiently interactive, and can decrease social engagement. These and other similar concerns of conventional approaches can reduce the overall user experience associated with viewing, consuming, or otherwise accessing content.

SUMMARY

Various embodiments of the present disclosure can include systems, methods, and non-transitory computer readable media configured to identify, in an image, a face associated with a user. It can be determined that the user has posted a comment in association with the image. A position in the image at which the face is located can be determined. The comment can be presented to appear to overlay the image and to appear within an allowable proximity from the position at which the face is located.

In an embodiment, a user interaction with respect to the face in the image can be detected. The presenting of the comment can be initiated when the user interaction with respect to the face in the image is detected. It can be detected that the user interaction with respect to the face in the image has ceased. The presenting of the comment can be ceased when the user interaction with respect to the face in the image has ceased.

In an embodiment, the user interaction with respect to the face in the image can include at least one of a mouse hover over the face in the image or a touch gesture directed at the face in the image.

In an embodiment, the comment can be included in a set of one or more comments provided by the user in association with the image. The comment can correspond to at least one of a most recent comment out of the set or a comment that has received a highest amount of social engagement out of the set.

In an embodiment, at least one of an identifier for the user, a location associated with the comment, a date associated with the comment, a time associated with the comment, or social engagement metrics associated with the comment can be presented with the comment.

In an embodiment, the comment can be presented via at least one of a boundless text field, a bounded text field, a speech bubble, a whisper bubble, a thought bubble, a scream bubble, a word balloon, or a dialogue balloon.

In an embodiment, it can be determined that a second user has posted a second comment in association with the image. A lack of a facial representation for the second user can be detected in the image. A graphical element can be presented to appear to overlay the image at a second position different from the position at which the face is located. The graphical element can be associated with the second user. The second comment can be presented to appear to overlay the image and to appear within a second allowable proximity from the second position.

In an embodiment, it can be determined that multiple comments are posted in association with the image. At least some of the multiple comments can be presented to appear to overlay the image. The at least some of the multiple comments can be presented over time via one or more animations. The comment can be presented with the at least some of the multiple comments.

In an embodiment, it can be determined that multiple comments are posted in association with the image. A command to present the multiple comments can be detected. The multiple comments can be presented to appear to overlay the image when the command is detected.

In an embodiment, it can be determined that a number of characters in the comment at least meets a specified threshold character count. The presenting of the comment can include scrolling through the characters in the comment over time.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
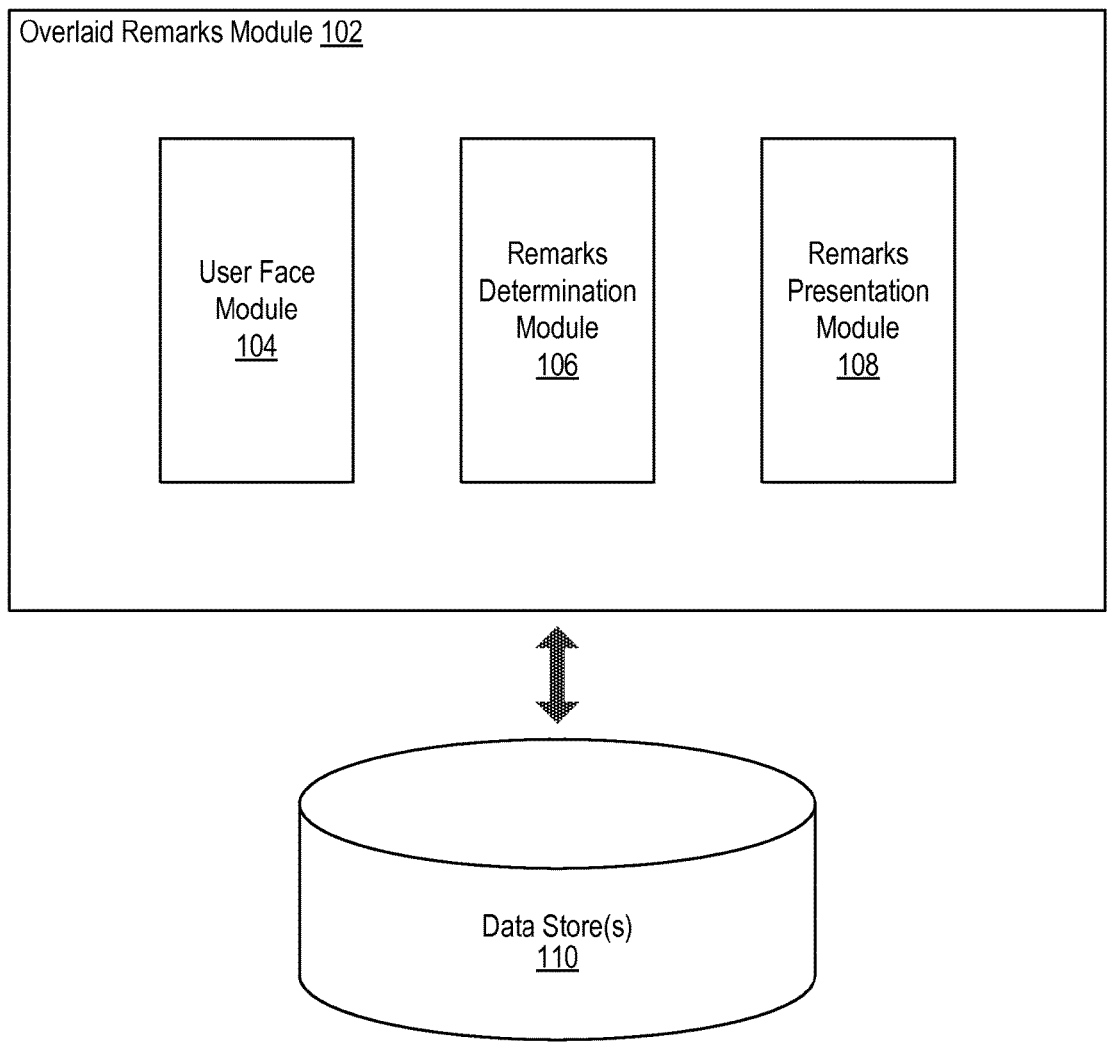
FIG. 1 illustrates an example system including an example overlaid remarks module configured to facilitate providing textual social remarks overlaid on media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Textual Social Remarks Overlaid on Media Content

People use computing devices (or systems) for a wide variety of purposes. Computing devices can provide different kinds of functionality. Users can utilize their computing devices to produce information, access information, and share information. In some cases, users can utilize computing devices to interact or engage with a social networking system (or service). For example, users can post or publish media content items, such as images, at the social networking system.

In some instances, an image posted or published by a user can be viewed or accessed by an audience including one or more audience members (e.g., viewers). The viewers of the image, including the user, can provide textual social remarks associated with the image, such as by providing comments for the image via the social networking system. Sometimes, contextual information about the image can also be provided. The contextual information can specify, for example, one or more names of users who are tagged in or tagged with the image, a location where the image was taken and/or posted, a time/date when the image was taken and/or posted, etc.

In some cases, an interface can be provided for viewers to view or access the image. Under conventional approaches, the interface typically presents the image in an image section and presents a comment section for viewers to post comments associated with the image. For example, the image can be presented in a left portion of the interface and the comments can be presented via the comment section in a right portion of the interface. Moreover, in accordance with conventional approaches, the presentation of the image and the comments is often times static and uninteresting. Furthermore, conventional approaches can reduce social engagement, since users are sometimes hesitant to access images and comments provided in accordance with such approaches. Accordingly, conventional approaches to providing and accessing content can be uninteresting, inefficient, and ineffective.

Therefore, an improved approach can be beneficial for addressing or alleviating various concerns associated with conventional approaches. The disclosed technology can drive, direct, and/or increase social engagement with respect to media content and associated remarks, such as images and comments associated with the images. The disclosed technology can present, display, or otherwise provide textual social remarks, such as comments, overlaid on media content. Various embodiments of the present disclosure can identify, in an image, a face associated with a user. It can be determined that the user has posted a comment in association with the image. A position in the image at which the face is located can be determined. The comment can be presented to appear to overlay the image and to appear within an allowable proximity from the position at which the face is located. It is contemplated that there can be many variations and/or other possibilities.

FIG. 1 illustrates an example system 100 including an example overlaid remarks module 102 configured to facilitate providing textual social remarks overlaid on media content, according to an embodiment of the present disclosure. As shown in the example of FIG. 1, the overlaid remarks module 102 can include a user face module 104, a remarks determination module 106, and a remarks presentation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the overlaid remarks module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the overlaid remarks module 102 can be implemented, in part or in whole, as software running on one or more computing devices or systems, such as on a user or client computing device. For example, the overlaid remarks module 102 or at least a portion thereof can be implemented as or within an application (e.g., app), a program, or an applet, etc., running on a user computing device or a client computing system, such as the user device 710 of FIG. 7. In another example, the overlaid remarks module 102 or at least a portion thereof can be implemented using one or more computing devices or systems that include one or more servers, such as network servers or cloud servers. In some instances, the overlaid remarks module 102 can, in part or in whole, be implemented within or configured to operate in conjunction with a social networking system (or service), such as the social networking system 730 of FIG. 7. It should be understood that there can be many variations or other possibilities.

The user face module 104 can be configured to facilitate identifying, in an image, a face associated with a user. In some embodiments, given an image that captures or includes the face of a particular user, the user face module 104 can detect the presence of the face in the image and can recognize the face as belonging to or being associated with the particular user. The user face module 104 can also determine the identity of the particular user (e.g., determine a social networking system account associated with the particular user). In some implementations, the user face module 104 can utilize one or more face detection techniques and/or face recognition techniques to facilitate identifying the face associated with the user. In some embodiments, the user face module 104 can enable the face associated with the user to be identified based on manual effort. For example, the user face module 104 can provide an option to manually tag the face and/or the user.

Moreover, the user face module 104 can be configured to facilitate determining a position in the image at which the face is located. In some embodiments, the user face module 104 can utilize image processing, such as one or more face detection techniques, to determine the position in the image at which the face is located. In some cases, the user face module 104 can enable the position of the face to be determined based on manual effort. For example, the user face module 104 can provide an option to manually tag where the face is in the image. It is contemplated that there can be many variations or other possibilities.

The remarks determination module 106 can be configured to facilitate determining that the user has posted textual social remarks, such as in the form of a comment, in association with the image. In general, textual social remarks can refer to text that is posted, published, or provided within the social networking system. Textual social remarks can, for example, correspond to or include one or more comments within the social networking system. In one example, the remarks determination module 106 can detect that a viewer of the image has posted a comment in a comment section for the image. The remarks determination module 106 will be discussed in more detail below with reference to FIG. 2A.

The remarks presentation module 108 can be configured to facilitate presenting the comment to appear to overlay the image and to appear within an allowable proximity from the position at which the face is located. For example, the remarks presentation module 108 can present, display, render, or otherwise cause the user's comment to appear as being overlaid on the image but below the user's face. Many variations are possible. More details regarding the remarks presentation module 108 will be provided below with reference to FIG. 2B.

Furthermore, in some embodiments, the overlaid remarks module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data. In some embodiments, the at least one data store 110 can store information that is utilized by the overlaid remarks module 102. In some instances, the at least one data store 110 can store information representing face models or facial characteristics associated with users. The face models or facial characteristics can be utilized to facilitate detecting, recognizing, or otherwise identifying faces and associated users. In addition, the data store 110 can store information related to images, such as pixel data representing the images or metadata for the images. Furthermore, the data store 110 can store information associated with textual social remarks, such as comments. It should be appreciated that there can be many variations or other possibilities.

In one example, a first user uploads and posts an image which includes the first user's face as well as a second user's face. The user face module 104 can identify the first user's face as being associated with the first user and can identify the second user's face as being associated with the second user. The remarks determination module 106 can determine that the first user has posted a first comment in a comment section for the image and that the second user has posted a second comment in the comment section. The user face module 104 can also determine where the first user's face is located in the image as well as where the second user's face is located. The remarks presentation module 108 can cause the first comment to overlay the image below the first user's face and can cause the second comment to overlay the image below the second user's face. In this example, the first comment can appear below the first user's face only when a user interaction is performed with respect to the first user's face (e.g., a mouse hover is detected over the first user's face). Similarly, the second comment can appear below the second user's face, for example, only when a user interaction is performed with respect to the second user's face. It should be understood that this example is provided for illustrative purposes and that there can be many variations.

Figure 2A:
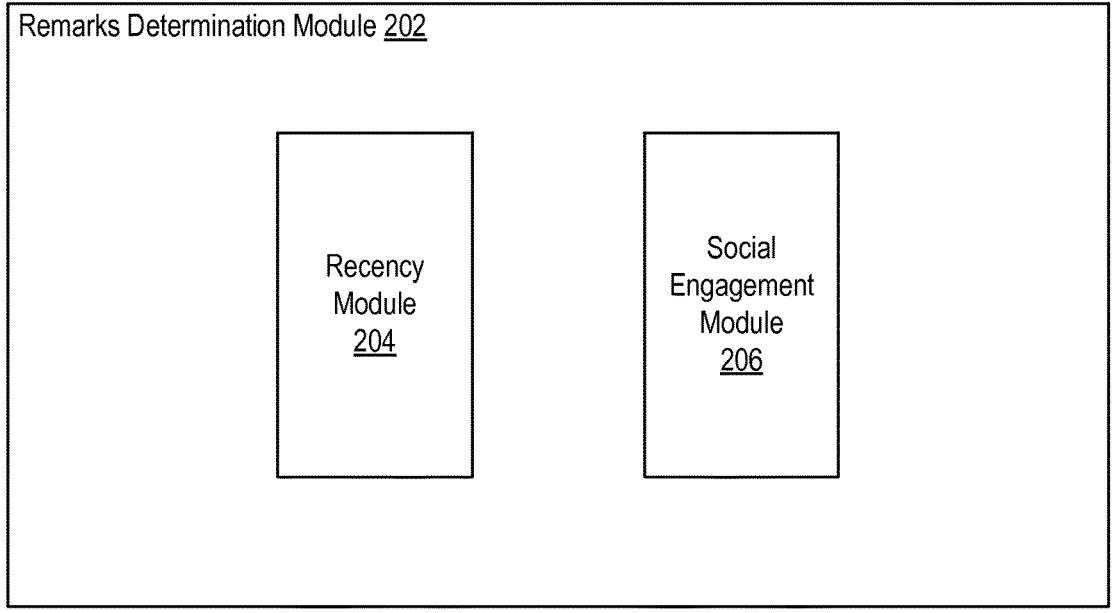
FIG. 2A illustrates an example remarks determination module configured to facilitate providing textual social remarks overlaid on media content, according to an embodiment of the present disclosure.

FIG. 2A illustrates an example remarks determination module 202 configured to facilitate providing textual social remarks overlaid on media content, according to an embodiment of the present disclosure. In some embodiments, the remarks determination module 106 of FIG. 1 can be implemented as the example remarks determination module 202. As shown in FIG. 2A, the remarks determination module 202 can include a recency module 204 and a social engagement module 206.

As discussed previously, the remarks determination module 202 can be configured to facilitate determining that a user has posted a comment in association with an image. In some embodiments, when the user posts a comment in a comment section associated with the image, the remarks determination module 202 can detect that the comment has been posted by the user. The remarks determination module 202 can also determine or acquire contextual information or metadata related to the comment, such as the identity of the user who posted the comment, where the comment was posted, when the comment was posted, etc. Furthermore, the remarks determination module 202 can access the comment.

In some instances, a set of one or more comments can be provided by the user in association with the image. In some implementations, one of the user's comments is selected, out of the set, to be overlaid on the image within the allowable proximity from the position of the user's face. In one example, the remarks determination module 202 can utilize the recency module 204 to identify or select a most recent comment out of the set, such as a most recently posted comment, a most recently liked comment, or a comment that was most recently replied to, etc. In another example, the remarks determination module 202 can utilize the social engagement module 206 to identify or select a comment that has received a highest amount of social engagement out of the set. In some cases, the social engagement module 206 can track one or more social engagement metrics for each comment in the set. The social engagement metrics can indicate, for example, how many likes each comment has received, how many times each comment has been replied to, etc. For instance, the social engagement module 206 can identify or select, out of the set, the comment with the highest number of likes. It should be appreciated that many variations are possible.

Figure 2B:
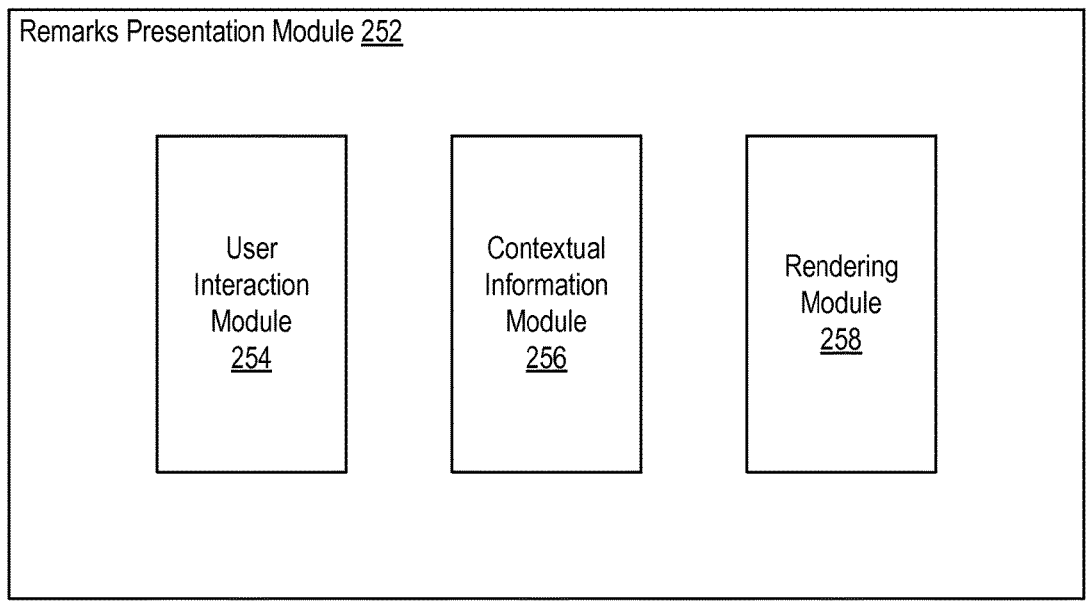
FIG. 2B illustrates an example remarks presentation module configured to facilitate providing textual social remarks overlaid on media content, according to an embodiment of the present disclosure.

FIG. 2B illustrates an example remarks presentation module 252 configured to facilitate providing textual social remarks overlaid on media content, according to an embodiment of the present disclosure. In some embodiments, the remarks presentation module 108 of FIG. 1 can be implemented as the example remarks presentation module 252. As shown in FIG. 2B, the remarks presentation module 252 can include a user interaction module 254, a contextual information module 256, and a rendering module 258.

As discussed above, the remarks presentation module 252 can be configured to facilitate presenting a user's comment to appear to overlay an image and to appear within an allowable proximity from a position at which a user's face is located. In some embodiments, the presenting of the comment can be initiated when a user interaction with respect to the face in the image is detected. For example, the remarks presentation module 252 can utilize the user interaction module 254 to detect the user interaction with respect to the face in the image. When the user interaction with respect to the face in the image is detected, the rendering module 258 can facilitate the presenting of the comment. Subsequently, the user interaction module 254 can detect that the user interaction with respect to the face in the image has ceased. When the user interaction with respect to the face in the image has ceased, the rendering module 258 can cease the presenting of the comment. In some cases, the user interaction with respect to the face in the image can include at least one of a mouse hover over the face in the image or a touch gesture (e.g., a finger tap, a finger press, a finger hold, etc.) directed at the face in the image. Many variation are possible.

In some embodiments, the contextual information module 256 can communicate and/or operate with the rendering module 258 to present contextual information or metadata associated with the presented comment. For instance, the contextual information module 256 and the rendering module 258 can cause the contextual information be presented with the comment. In some cases, the contextual information can include, but is not limited to, at least one of an identifier for the user who posted the comment, a location associated with the comment, a date associated with the comment, a time associated with the comment, or social engagement metrics (e.g., number of likes) associated with the comment, etc.

In some implementations, the comment can be presented by the rendering module 258 via at least one of a boundless text field (e.g., text only), a bounded text field (e.g., a text box), a speech bubble, a whisper bubble, a thought bubble, a scream bubble, a word balloon, or a dialogue balloon, etc. In some instances, the comment can be presented to resemble a comic strip or a cartoon.

Moreover, in some embodiments, it can be determined that a number of characters in the comment at least meets a specified threshold character count. If so, the rendering module 258 can cause the presenting of the comment to include scrolling through the characters in the comment over time. Additionally or alternatively, in some cases, if the number of characters in the comment at least meets the specified threshold character count, the comment can be truncated. In some instances, an ellipsis can be presented with the truncated comment.

Furthermore, as illustrated previously, the remarks presentation module 252, the remarks determination module 202, and the user face module 104 can often times communicate and/or operate with one another. In one example, the remarks determination module 202 can determine that a second user has posted a second comment in association with the image. The user face module 104 can detect, in the image, a lack of a facial representation for the second user. The remarks presentation module 252 can present a graphical element to appear to overlay the image at a second position different from the position at which the face is located. The graphical element can be associated with the second user, such as when at least a portion of a profile picture of the second user is provided via the graphical element. Further, the remarks presentation module 252 can present the second comment to appear to overlay the image and to appear within a second allowable proximity from the second position.

In another example, the remarks determination module 202 can determine that multiple comments are posted in association with the image. The remarks presentation module 252 can present at least some of the multiple comments to appear to overlay the image. The at least some of the multiple comments can be presented over time via one or more animations. The comment can also be presented with the at least some of the multiple comments. In some cases, the at least some of the multiple comments can be stacked vertically and/or horizontally. In some instances, the at least some of the multiple comments can be sorted based on a chronological order.

In a further example, the remarks determination module 202 can determine that multiple comments are posted in association with the image. The remarks presentation module 252 can detect a command to present the multiple comments. The remarks presentation module 252 can also present the multiple comments to appear to overlay the image when the command is detected. In some cases, the command can correspond to a user interaction (e.g., mouse hover, touch gesture, etc.) with respect to a comment section associated with the image. As discussed, in some cases, the multiple comments can be stacked and/or sorted. It is contemplated that many variations are possible.

Figure 3:
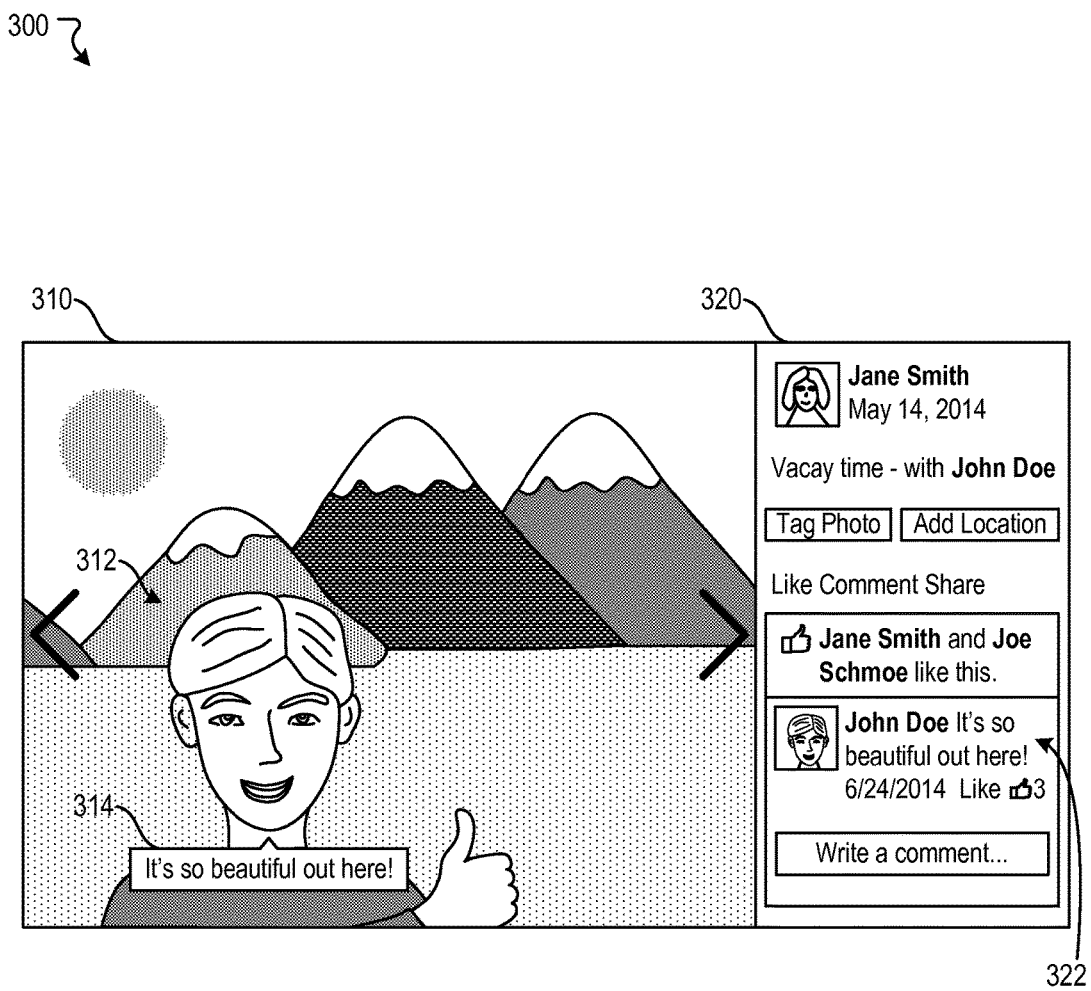
FIG. 3 illustrates an example scenario associated with providing textual social remarks overlaid on media content, according to an embodiment of the present disclosure.

FIG. 3 illustrates an example scenario 300 associated with providing textual social remarks overlaid on media content, according to an embodiment of the present disclosure. The example scenario 300 illustrates an interface for providing media content and textual social remarks, such as comments. As shown in FIG. 3, the interface can include a left interface portion 310 and a right interface portion 320.

In this example, the left interface portion 310 can present an image. In some instances, the image can be provided from a photo album, a profile, a timeline, a newsfeed, or a story, etc. The image can be provided within the social networking system or remote from the social networking system, such as by a third party media content system (or service). In this example scenario 300, the image can capture, represent, or include a face 312 of a user, John Doe.

Moreover, the right interface portion 320 can provide a comment section for inputting and presenting comments associated with the image. The right interface portion 320 can also provide contextual information associated with the image, such as an identifier for the user (e.g., Jane Smith) who posted the image, a description for the image, a time, date, and/or location associated with the image, etc.

In this example scenario 300, the disclosed technology can identify John Doe's face 312 in the image. It can be determined that John Doe has posted a comment in association with the image. As shown in the example scenario 300, John Doe posted a comment ("It's so beautiful out here!") 322 in the comment section of the right interface portion 320. A position in the image at which John Doe's face 312 is located can be determined. The comment can then be presented to appear to overlay the image and to appear within an allowable proximity from the position at which John Doe's face 312 is located. In this example, the comment is presented via a speech bubble 314 that appears to overlay the image and that appears just below the position of John Doe's face 312. It should be appreciated that this example is provided for illustrative purposes and that many variations are possible.

Figure 4:
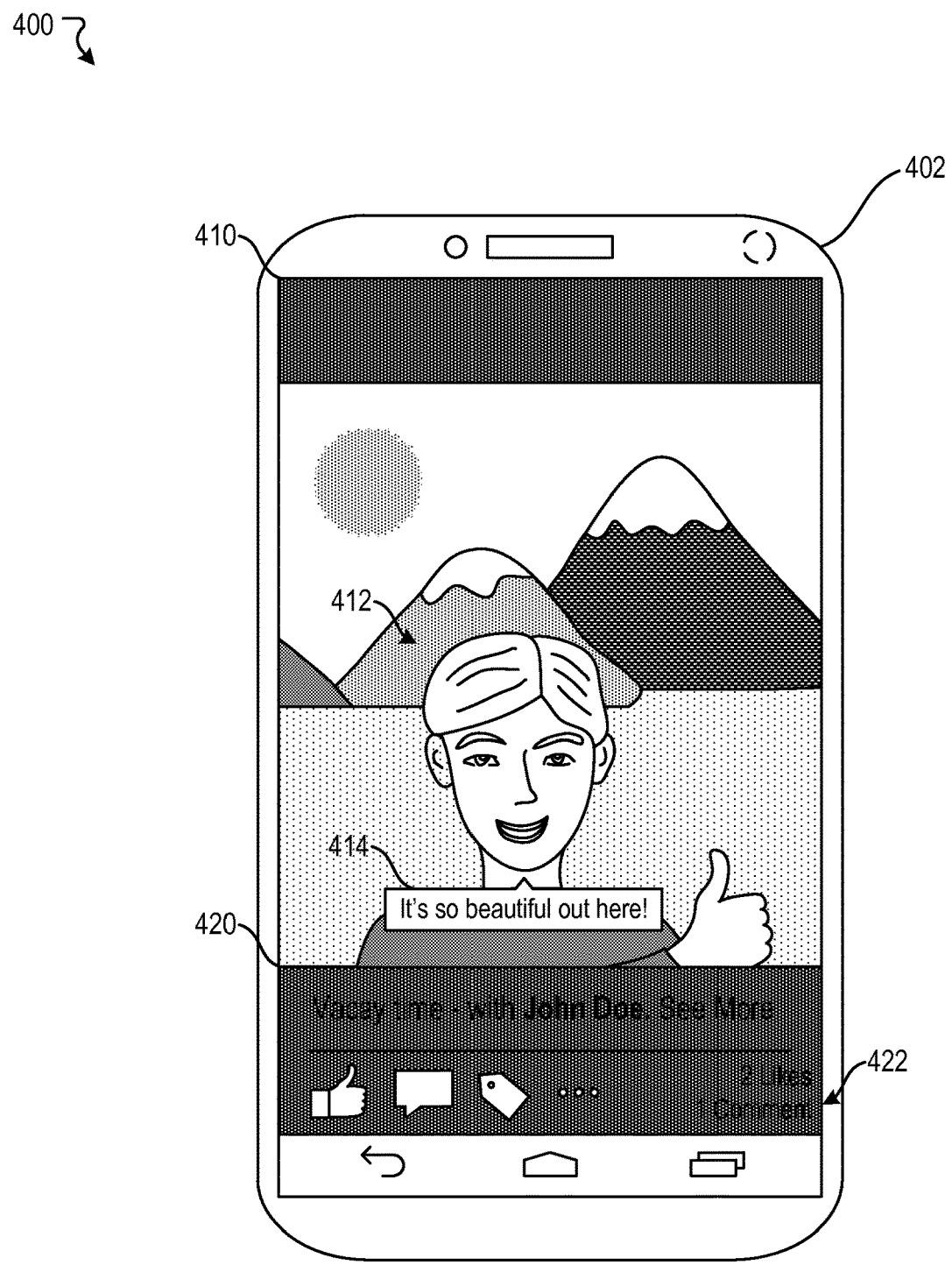
FIG. 4 illustrates an example scenario associated with providing textual social remarks overlaid on media content, according to an embodiment of the present disclosure.

FIG. 4 illustrates an example scenario 400 associated with providing textual social remarks overlaid on media content, according to an embodiment of the present disclosure. The example scenario 400 illustrates a computing device 402, such as a smartphone, table, etc. The computing device 402 can present an interface for providing media content and textual social remarks, such as comments. As shown in FIG. 4, the interface can include an upper interface portion 410 and a lower interface portion 420.

In the example scenario 400, the upper interface portion 410 can present an image and the lower interface portion 420 can present information associated with the image. In this example, John Doe has posted a comment ("It's so beautiful out here!") in association with the image. The comment can be accessed or viewed via an interactive element (e.g., link, clickable tag, etc.) 422 in the lower interface portion 420. Moreover, the disclosed technology can identify John Doe's face 412 in the image, determine that John Doe has posted the comment, determine where John Doe's face 412 is located in the image, and present the comment via a speech bubble 414 that appears to overlay the image and that appears just below the position of John Doe's face 412. Again, this example and other examples herein are provided for illustrative purposes. Many variations are possible.

Figure 5:
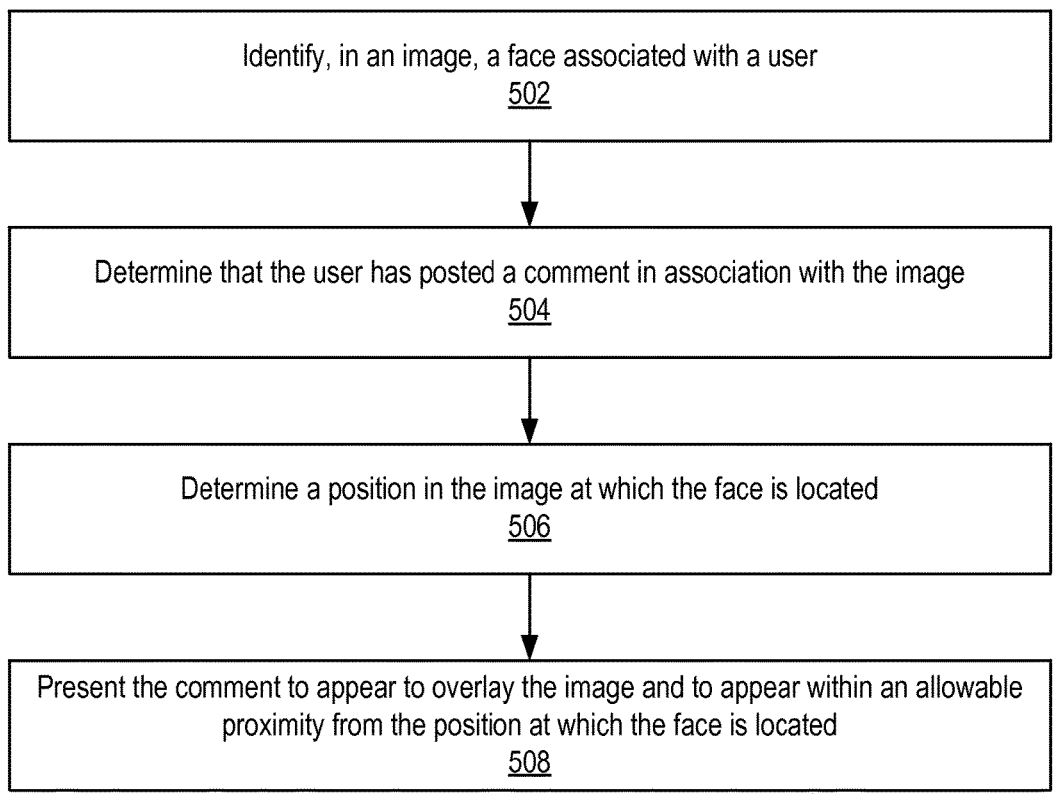
FIG. 5 illustrates an example method associated with providing textual social remarks overlaid on media content, according to an embodiment of the present disclosure.

FIG. 5 illustrates an example method 500 associated with providing textual social remarks overlaid on media content, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify, in an image, a face associated with a user. At block 504, the example method 500 can determine that the user has posted a comment in association with the image. At block 506, the example method 500 can determine a position in the image at which the face is located. At block 508, the example method 500 can present the comment to appear to overlay the image and to appear within an allowable proximity from the position at which the face is located.

Figure 6:
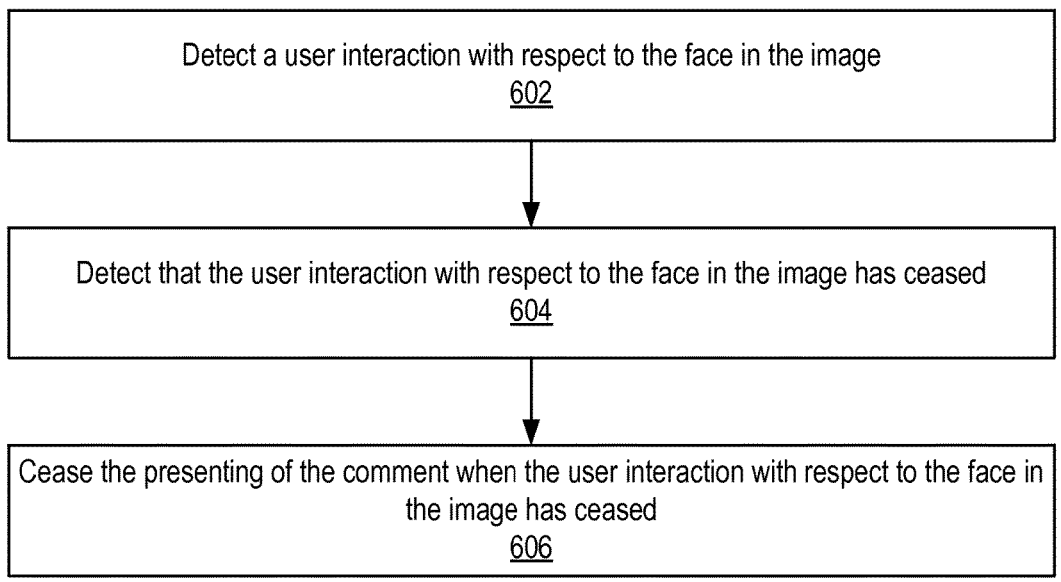
FIG. 6 illustrates an example method associated with providing textual social remarks overlaid on media content, according to an embodiment of the present disclosure.

FIG. 6 illustrates an example method 600 associated with providing textual social remarks overlaid on media content, according to an embodiment of the present disclosure. As discussed above, it should be understood that there can be additional, fewer, or alternative steps performed in similar or alternative orders, or in parallel, within the scope of the various embodiments unless otherwise stated.

At block 602, the example method 600 can detect a user interaction with respect to the face in the image. The presenting of the comment can be initiated when the user interaction with respect to the face in the image is detected. At block 604, the example method 600 can detect that the user interaction with respect to the face in the image has ceased. At block 606, the example method 600 can cease the presenting of the comment when the user interaction with respect to the face in the image has ceased.

In some embodiments, the comment can include an interactive element, such as a link or a clickable tag. The comment can be presented similar to a hover card, such that the interactive element is presentable and navigable via the comment. In some embodiments, however, only the text of the interactive element is presented in the comment.

In some embodiments, the disclosed technology can be implemented within or remote from the social networking system. For example, the disclosed technology can be utilized with an online media library and/or a social media system (or service).

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
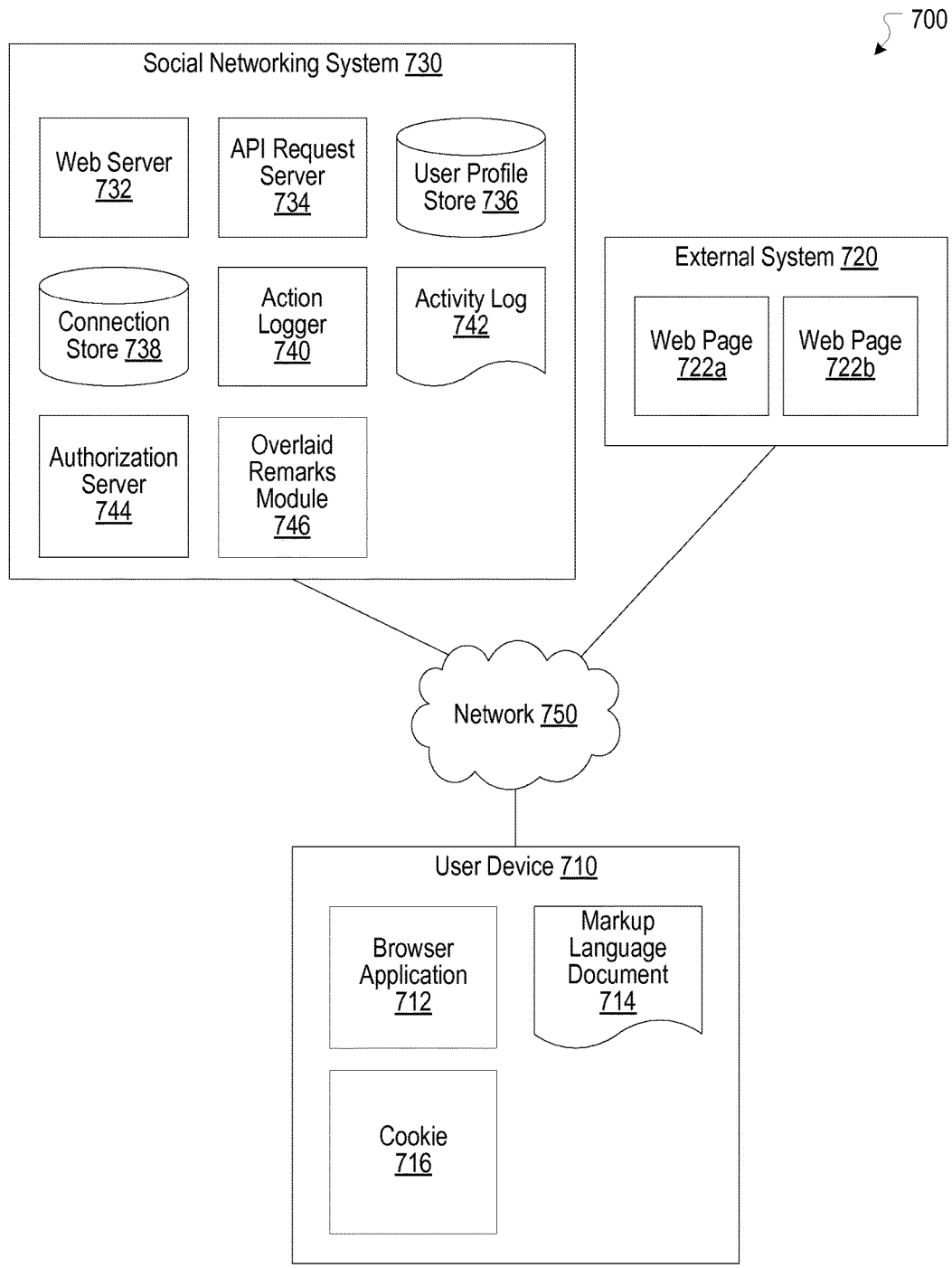
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smartphone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a overlaid remarks module 746. The overlaid remarks module 746 can, for example, be implemented as the overlaid remarks module 102 of FIG. 1. As discussed previously, it should be appreciated that there can be many variations or other possibilities. Other features of the overlaid remarks module 746 are discussed herein in connection with the overlaid remarks module 102.

Hardware Implementation

Figure 8:
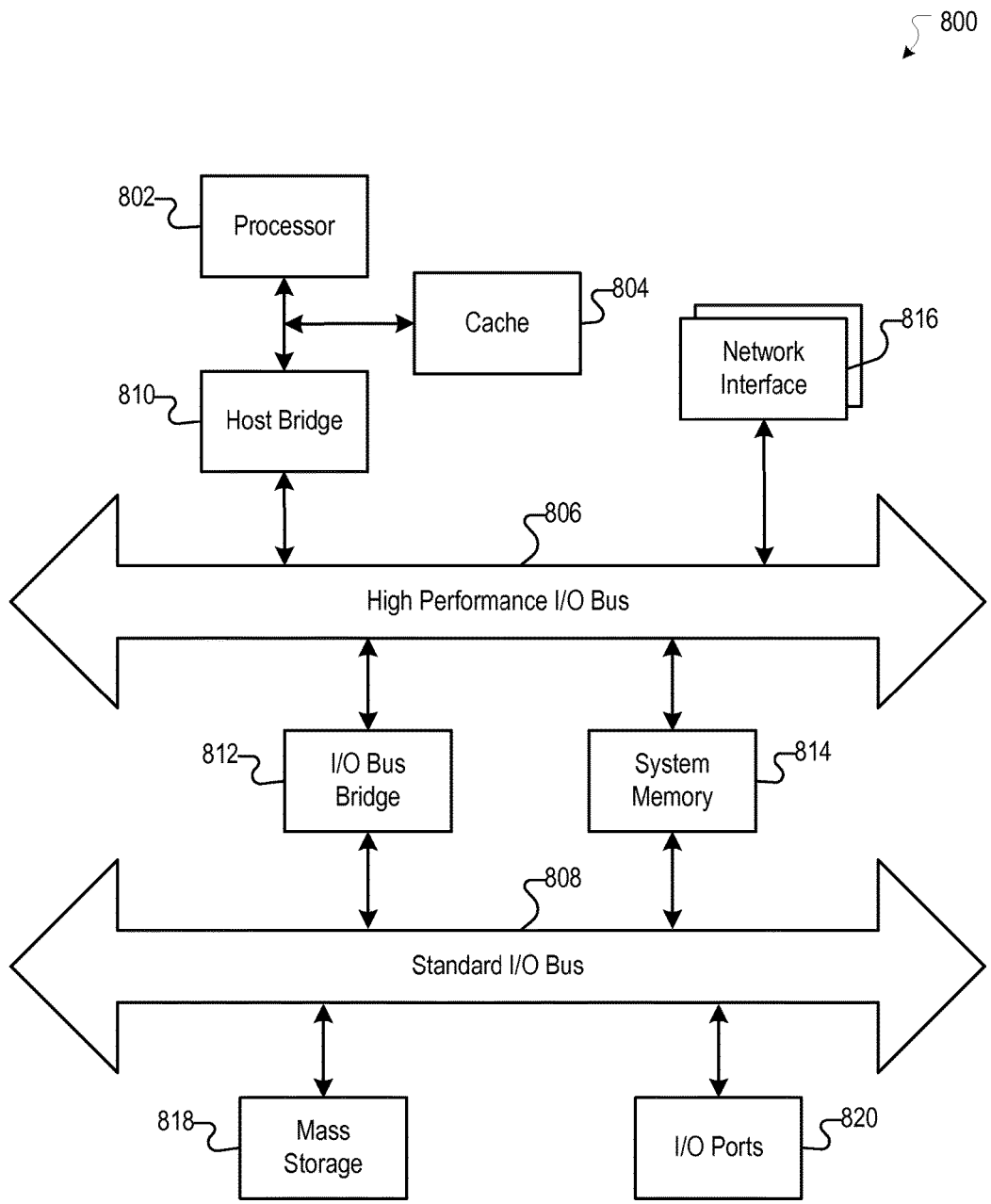
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, an image posted to a social networking system by a first user;
    identifying, by the computing system, in the image, a face associated with a second user;
    determining, by the computing system, that the second user has posted a plurality of comments on the social networking system in response to the image;
    selecting, by the computing system, a first comment from the plurality of comments for overlaid presentation on the image based on a determination that the first comment corresponds to at least one of a most recent comment of the plurality of comments or a comment that has received a highest amount of social engagement out of the plurality of comments;
    determining, by the computing system, a position in the image at which the face is located; and
    providing, by the computing system, the first comment for presentation on the image such that the first comment appears to overlay the image and appears within an allowable proximity from the position at which the face is located.

2. The computer-implemented method of claim 1, further comprising:
    detecting a user interaction with respect to the face in the image, wherein presentation of the first comment is initiated when the user interaction with respect to the face in the image is detected;
    detecting that the user interaction with respect to the face in the image has ceased; and
    ceasing presentation of the first comment when the user interaction with respect to the face in the image has ceased.

3. The computer-implemented method of claim 2, wherein the user interaction with respect to the face in the image includes at least one of a mouse hover over the face in the image or a touch gesture directed at the face in the image.

4. The computer-implemented method of claim 1, wherein the first comment is presented with at least one of an identifier for the second user, a location associated with the first comment, a date associated with the first comment, a time associated with the first comment, or social engagement metrics associated with the first comment.

5. The computer-implemented method of claim 1, wherein the first comment is presented via at least one of a boundless text field, a bounded text field, a speech bubble, a whisper bubble, a thought bubble, a scream bubble, a word balloon, or a dialogue balloon.

6. The computer-implemented method of claim 1, further comprising:
  determining that a third user has posted a second comment in response to the image;
  detecting, in the image, a lack of a facial representation for the third user;
  providing for presentation a graphical element to appear to overlay the image at a second position different from the position at which the face is located, wherein the graphical element is associated with the third user; and
  providing for presentation the second comment such that the second comment appears to overlay the image and appears within a second allowable proximity from the second position.

7. The computer-implemented method of claim 1, further comprising:
  determining that multiple comments are posted on the social networking system in response to the image; and
  providing for presentation at least some of the multiple comments such that the at least some of the multiple comments appear to overlay the image, wherein the at least some of the multiple comments are presented over time via one or more animations, wherein the first comment is presented with the at least some of the multiple comments.

8. The computer-implemented method of claim 1, further comprising:
  determining that multiple comments are posted on the social networking system in response to the image;
  detecting a command to present the multiple comments; and
  providing for presentation the multiple comments such that the multiple comments appear to overlay the image when the command is detected.

9. The computer-implemented method of claim 1, further comprising:
  determining that a number of characters in the first comment at least meets a specified threshold character count, wherein the presenting of the first comment includes scrolling through the characters in the first comment over time.

10. A system comprising:
  at least one processor; and
  a memory storing instructions that, when executed by the at least one processor, cause the system to perform:
    receiving an image posted to a social networking system by a first user;
    identifying, in the image, a face associated with a second user;
    determining that the second user has posted a plurality of comments on the social networking system in response to the image;
    selecting a first comment from the plurality of comments for overlaid presentation on the image based on a determination that the first comment corresponds to at least one of a most recent comment of the plurality of comments or a comment that has received a highest amount of social engagement out of the plurality of comments;
    determining a position in the image at which the face is located; and
    providing the first comment for presentation on the image such that the first comment appears to overlay the image and appears within an allowable proximity from the position at which the face is located.

11. The system of claim 10, wherein the instructions cause the system to further perform:
  detecting a user interaction with respect to the face in the image, wherein presentation of the first comment is initiated when the user interaction with respect to the face in the image is detected;
  detecting that the user interaction with respect to the face in the image has ceased; and
  ceasing presentation of the first of the comment when the user interaction with respect to the face in the image has ceased.

12. The system of claim 10, wherein
  the first comment is presented with at least one of an identifier for the second user, a location associated with the comment, a date associated with the comment, a time associated with the comment, or social engagement metrics associated with the comment.

13. The system of claim 10, wherein the first comment is presented via at least one of a boundless text field, a bounded text field, a speech bubble, a whisper bubble, a thought bubble, a scream bubble, a word balloon, or a dialogue balloon.

14. A non-transitory computer-readable storage medium including instructions that, when executed by at least one processor of a computing system, cause the computing system to perform:
  receiving an image posted to a social networking system by a first user;
  identifying, in the image, a face associated with a second user;
  determining that the second user has posted a plurality of comments on the social networking system in response to the image;
  selecting a first comment from the plurality of comments for overlaid presentation on the image based on a determination that the first comment corresponds to at least one of a most recent comment of the plurality of comments or a comment that has received a highest amount of social engagement out of the plurality of comments;
  determining a position in the image at which the face is located; and
  providing the first comment for presentation on the image such that the first comment appears to overlay the image and appears within an allowable proximity from the position at which the face is located.

15. The non-transitory computer-readable storage medium of claim 14, wherein the instructions cause the system to further perform:
  detecting a user interaction with respect to the face in the image, wherein presentation of the first comment is initiated when the user interaction with respect to the face in the image is detected;
  detecting that the user interaction with respect to the face in the image has ceased; and
  ceasing presentation of the first comment when the user interaction with respect to the face in the image has ceased.

16. The non-transitory computer-readable storage medium of claim 14, wherein
  the first comment is presented with at least one of an identifier for the second user, a location associated with the comment, a date associated with the comment, a time associated with the comment, or social engagement metrics associated with the comment.

17. The non-transitory computer-readable storage medium of claim 14, wherein the first comment is presented via at least one of a boundless text field, a bounded text field, a speech bubble, a whisper bubble, a thought bubble, a scream bubble, a word balloon, or a dialogue balloon.

* * * * *